Patented Aug. 6, 1929.

1,723,298

UNITED STATES PATENT OFFICE.

WILLIAM H. PETERSON AND EDWIN B. FRED, OF MADISON, WISCONSIN, ASSIGNORS TO WISCONSIN ALUMNI RESEARCH FOUNDATION, A CORPORATION.

PRODUCTION OF LACTIC AND ACETIC ACIDS.

No Drawing.    Application filed August 17, 1927.  Serial No. 213,702.

The present invention relates to the production of lactic and acetic acids from hitherto unused and waste materials, or from other materials by a heretofore unisolated micro-organism.

Lactic and acetic acids, as heretofore produced, have been obtained exclusively from hexose or hexose yielding materials such as glucose, maltose and starch, but not from materials yielding both hexoses and pentoses such as wood, straw and corncobs. This process has for one of its purposes the fermentation of both hexoses and pentoses simultaneously by the hereinafter described bacteria, and thus furnishing a new and valuable source of lactic and acetic acids, the lactic acid being the one of principal importance. Another purpose is to provide a process for the fermentation of either hexoses or pentoses by the said bacteria to produce lactic and acetic acids. The process is the same when used upon materials containing hexoses or pentoses or a mixture of hexoses and pentoses, and we, therefore, for convenience, describe it in respect only to a material containing both hexoses and pentoses.

The mixture of hexoses and pentoses may be obtained from wood, sawdust, straw, corncobs, corn stover, cotton seed hulls or other equivalent plant materials by hydrolysis with dilute acids under suitable conditions of temperature and pressure, e. g., sulphuric acid of 2.5 per cent. strength at a temperature of one hundred pounds steam pressure for fifteen minutes. The unhydrolyzed residue is removed by filtering and leaching with water which gives a dark colored liquid and contains the hexoses and pentoses. This liquid may be diluted or concentrated to give a concentration of sugars most suitable for fermentation, from two to four per cent.

To bring about this fermentation the acid solution is neutralized with milk of lime or calcium carbonate and suitable nitrogenous nutrients such as malt sprouts, tankage or other protein containing material are added. An excess of calcium carbonate or other alkaline reagent is added to neutralize the lactic and acetic acids as they are formed by the bacteria. The medium is then inoculated with a suitable culture of the bacteria.

An excellent method of inoculation is to add an inoculum equivalent to about one per cent. of the volume of medium to be fermented. The inoculum may be obtained by seeding a small quantity of the same medium with the bacteria and allowing them to grow for twenty-four hours before using. In this manner, a vigorous and active inoculum is built up which when transferred to the larger volume of medium produces a rapid fermentation and converts the hexoses and pentoses almost quantitatively to lactic and acetic acids. After a few days the fermentation is completed and the lactic and acetic acids may be obtained by several well-known methods. The details of the fermentation process may be varied considerably with respect to concentration of sugars and nutrients, duration of the fermentation and temperature employed.

The newly discovered micro-organism which we employ may be isolated from fermenting plant material such as silage or sauerkraut by plating juice from such materials and picking isolated colonies according to well known bacteriological methods. This micro-organism may be identified in accordance with the descriptive chart of the Society of American Bacteriologists, as follows:

*Morphology.*

Vegetative cells.
    Medium used, yeast water agar; reaction, slightly acid; temperature, 28° C.; age, 18 hours.
    Form, short rods.
    Arrangement, single and in chains.
    Limits of length, 0.7–1.1 microns; of diameter, 0.6 microns.
    Ends, blunt.
Sporangia.
    Absent.
Motility.
    None.
Flagella.
    None.
Staining reactions.
    1 day, gram positive.
    Technic used, standard methods.

*Cultural characteristics.*

*Agar stab.*
  Medium, glucose yeast-water agar.
  Incubation temperature, 28° C.
  Age, 24 hours.
  Growth, uniform.
  Line of puncture, papillate.
  Optical characters, opaque.
  Medium, unchanged.

*Liquid medium.*
  Glucose yeast-water.
  Surface growth, none.
  Clouding, moderate.
  Odor, absent.
  Sediment, slight and flocculent.

*Physiology.*

*Temperature relations.*
  Optimum, 28°–30° C.

*Relation to reaction of medium.*
  Medium used, glucose, yeast-water.
  Optimum H-ion conc., about pH 6.5.
  Limits of pH for growth, from 3.5 to 8.0.

*Relation to oxygen.*
  Anaerobic growth better than aerobic.

*Milk.*
  Reaction, acid after 2 days and remains acid.
  Acid curd, after 3–5 days.
  Peptonization, none.
  Indicator in milk, litmus.
  Deduction of litmus, begins in 24 hours and remains reduced.

*Nitrate reduction.*
  None.

*Hydrolysis of starch.*
  None.

*Fermentation.*
  Ferments; xylose, arabinose, mannose, galactose, glucose, fructose, lactose, maltose, sucrose, raffinose, salicin, amygdalin, mannitol, melezitose—slightly, dextrin—slightly, alpha-methyl glucoside—slightly, sodium lactate—slightly.

*Special tests.*
  Fermentation products.
    From pentoses, acetic acid and lactic acid. No gas.
    From hexoses, lactic acid. No gas, no ethyl alcohol.

In place of the dilute sirup obtained by the hydrolysis of wood, sawdust, corncobs, straw, etc., molasses or other cheap saccharine materials containing both hexoses and pentoses may be employed. It is not to be understood however, that the mico-organisms which we have described require both hexoses and pentoses for their action. Either of these groups of carbohydrates may be fermented separately or combined. The peculiar and novel feature of these bacteria is that they ferment both groups of sugars.

We claim:

1. The process of fermenting sugars with the herein described bacteria.

2. The process of fermenting hexoses with the herein described bacteria.

3. The process of producing lactic acid comprising the fermenting of sugars with the herein described bacteria.

4. The process of producing lactic and acetic acids comprising the fermenting of sugars with the herein described bacteria.

5. The process of producing lactic and acetic acids from hexoses by fermentation, employing as its means the herein described bacteria.

6. The process of producing lactic acid from hexoses by fermentation, employing as its means the herein described bacteria.

7. The process of producing lactic and acetic acids by the fermentation of liquids containing mixtures of hexoses and pentoses by means of the herein described bacteria.

8. The process of producing lactic and acetic acids from materials which have been hydrolyzed to produce hexoses and pentoses by means of the herein described bacteria.

9. The process which comprises subjecting hexoses and pentoses to the action of the herein described bacteria and allowing the fermentation to proceed until substantially all of the hexoses and pentoses have been converted into lactic and acetic acids.

10. The process of treating materials containing a mixture of hexoses and pentoses, which consists in hydrolyzing the materials with dilute acids to secure a concentration of sugars suitable for fermentation, neutralizing the said concentration and inoculating the mixture with the herein described bacteria, to cause fermentation and the production of lactic and acetic acids.

11. The process of treating materials containing a mixture of hexoses and pentoses, which consists in hydrolyzing the materials with dilute acids to secure a concentration of sugars suitable for fermentation, neutralizing the said concentration, adding nitrogeneous nutrients, and inoculating the mixture with the herein described bacteria, to cause fermentation and the production of lactic and acetic acids.

In witness that we claim the foregoing, we have hereunto subscribed our names this 12th day of August, 1927.

WILLIAM H. PETERSON.
EDWIN B. FRED.